(12) United States Patent
Vande Vusse et al.

(10) Patent No.: US 8,390,150 B2
(45) Date of Patent: Mar. 5, 2013

(54) FIELD DEVICE INTERFACE WITH NETWORK PROTECTION MECHANISM

(75) Inventors: Daniel E. Vande Vusse, Savage, MN (US); Alden C. Russell, III, Minnetonka, MN (US); Douglas W. Arntson, Maple Grove, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 189 days.

(21) Appl. No.: 12/502,554

(22) Filed: Jul. 14, 2009

(65) Prior Publication Data

US 2010/0013325 A1    Jan. 21, 2010

Related U.S. Application Data

(60) Provisional application No. 61/080,901, filed on Jul. 15, 2008.

(51) Int. Cl.
*H01H 47/00*    (2006.01)

(52) U.S. Cl. ........ 307/130; 307/112; 307/116; 307/125; 307/138; 702/57; 702/64; 702/65; 702/118; 702/119; 702/122; 710/37; 700/66; 361/245; 361/246

(58) Field of Classification Search ........... 307/112, 307/116, 125, 138; 702/57, 64, 65, 118, 702/119, 122; 710/37; 700/66; 361/245, 361/246
See application file for complete search history.

(56) References Cited

U.S. PATENT DOCUMENTS

| | | | |
|---|---|---|---|
| 5,166,678 A * | 11/1992 | Warrior | 340/870.15 |
| 5,182,466 A * | 1/1993 | Ohkubo | 307/127 |
| 5,184,122 A * | 2/1993 | Decious et al. | 340/870.16 |
| 5,442,639 A | 8/1995 | Crowder et al. | 371/20.1 |
| 5,671,355 A * | 9/1997 | Collins | 709/250 |
| 5,793,963 A * | 8/1998 | Tapperson et al. | 709/201 |
| 5,938,754 A * | 8/1999 | Edwards et al. | 710/305 |
| 6,211,649 B1 | 4/2001 | Matsuda | 320/115 |
| 6,304,934 B1 | 10/2001 | Pimenta et al. | 710/129 |
| 6,377,859 B1 * | 4/2002 | Brown et al. | 700/79 |
| 6,397,322 B1 * | 5/2002 | Voss | 712/35 |
| 6,404,393 B1 | 6/2002 | Nelson et al. | 343/702 |
| 6,449,715 B1 * | 9/2002 | Krivoshein | 713/1 |
| 6,601,124 B1 | 7/2003 | Blair | 710/305 |

(Continued)

FOREIGN PATENT DOCUMENTS

EP    1 819 028 A2    8/2007
GB    2 394 124    4/2004

(Continued)

OTHER PUBLICATIONS

International Search Report and Written Opinion for application No. PCT/US2009/050662, dated Oct. 1, 2009.

(Continued)

*Primary Examiner* — Daniel Cavallari
(74) *Attorney, Agent, or Firm* — Christophe R. Christenson; Westman, Champlin & Kelly, PA

(57) ABSTRACT

A field device interface module includes a connector, a plurality of terminals, a protocol interface module, a controller and a power supply module. The connector is configured to operably couple to a computer. The terminals are operably coupleable to a field device. The protocol interface module is coupled to the plurality of terminals and configured to generate signals in accordance with a process communication protocol. A power supply module is coupled to the plurality of terminals. The controller is coupled to the protocol interface module and to the power supply module and is configured to measure a voltage across the plurality of terminals and selectively cause the power supply module to provide power to the field device.

8 Claims, 4 Drawing Sheets

U.S. PATENT DOCUMENTS

| | | | | |
|---|---|---|---|---|
| 6,640,308 | B1* | 10/2003 | Keyghobad et al. | 713/300 |
| 6,839,790 | B2 | 1/2005 | Barros De Almeida et al. | 710/305 |
| 6,959,356 | B2* | 10/2005 | Packwood et al. | 710/315 |
| 7,058,521 | B2 | 6/2006 | Kowal et al. | 702/45 |
| 7,421,531 | B2* | 9/2008 | Rotvold et al. | 710/305 |
| 7,454,553 | B2* | 11/2008 | Nelson et al. | 710/315 |
| 7,480,487 | B2 | 1/2009 | Smart et al. | 455/69 |
| 7,848,827 | B2* | 12/2010 | Chen | 700/19 |
| 7,932,714 | B2 | 4/2011 | Fauveau | 324/126 |
| 2002/0167904 | A1* | 11/2002 | Borgeson et al. | 370/241 |
| 2002/0169582 | A1* | 11/2002 | Eryurek et al. | 702/183 |
| 2003/0236937 | A1* | 12/2003 | Barros De Almeida et al. | 710/305 |
| 2004/0012264 | A1* | 1/2004 | Burger et al. | 307/64 |
| 2004/0073402 | A1* | 4/2004 | DelaCruz et al. | 702/183 |
| 2004/0111238 | A1 | 6/2004 | Kantzes et al. | 702/183 |
| 2004/0199681 | A1* | 10/2004 | Hedtke | 710/37 |
| 2004/0203434 | A1 | 10/2004 | Karschnia et al. | 455/67.11 |
| 2004/0228184 | A1 | 11/2004 | Mathiowetz | 365/202 |
| 2004/0230327 | A1 | 11/2004 | Opheim et al. | 700/83 |
| 2005/0030185 | A1* | 2/2005 | Huisenga et al. | 340/635 |
| 2005/0114086 | A1 | 5/2005 | Zielinski et al. | 702/184 |
| 2005/0190054 | A1* | 9/2005 | Scott et al. | 340/517 |
| 2005/0225923 | A1* | 10/2005 | Howald | 361/234 |
| 2006/0080631 | A1 | 4/2006 | Koo | 716/17 |
| 2006/0161359 | A1* | 7/2006 | Lalla | 702/65 |
| 2006/0244424 | A1* | 11/2006 | Nelson | 322/37 |
| 2006/0282580 | A1* | 12/2006 | Russell et al. | 710/62 |
| 2006/0291438 | A1 | 12/2006 | Karschnia et al. | 370/338 |
| 2007/0233316 | A1* | 10/2007 | Nelson et al. | 700/220 |
| 2008/0114911 | A1 | 5/2008 | Schumacher | 710/72 |
| 2008/0174178 | A1* | 7/2008 | Jakobsson et al. | 307/31 |
| 2008/0211660 | A1* | 9/2008 | Takeuchi | 340/514 |

FOREIGN PATENT DOCUMENTS

| | | |
|---|---|---|
| RU | 39728 | 8/2004 |
| WO | WO 2009/003146 | 12/2008 |
| WO | WO 2009/003148 | 12/2008 |

OTHER PUBLICATIONS

Technical Data Sheet: VIATOR® USB HART® Interface (Model 010031). MACTek Measurement and Control Technologies.

VIATOR® Bluetooth® Wireless Technology Interface for use with HART field devices. MACTek Measurement and Control Technologies retrieved from www.mactekcorp.com/product5.htm.

Product Data Sheet: VIATOR RS232. MACTek Measurement and Control Technologies retrieved from www.mactekcorp.com/product1.htm.

Summons to attend Oral Proceedings for the European application No. 06772452.6, dated Jul. 16, 2010.

Second Official Action from Russian patent application No. 2007149034, dated Nov. 16, 2009.

Official Action for Russian patent application No. 2007149034, filed Jun. 7, 2006.

Second Office Action from Chinese patent application No. 200680014971.5, dated Jun. 5, 2009.

First Communication of European patent application No. 06 772 452.6, filed Jun. 7, 2006.

International Search Report and Written Opinion of application No. PCT/US2006/022161, dated Nov. 3, 2006.

First Office Action from Chinese patent application No. 200680014971.5, filed Jun. 7, 2006.

Communication pursuant to Rule 161(1) and 162 EPC from European patent application No. 09790452.8 dated Feb. 22, 2011.

Decision to Refuse and Minutes of the Oral Proceedings from the European patent application No. 06772452.6 dated Jan. 12, 2011.

Official Action from the corresponding Russian patent application No. 2011105428 dated Apr. 6, 2012.

Office Action from the corresponding Chinese patent application No. 2009801279565 dated Sep. 28, 2012. 16 pages.

* cited by examiner

FIELD DEVICE INTERFACE WITH NETWORK PROTECTION MECHANISM

CROSS-REFERENCE TO RELATED APPLICATION

The present application is based on and claims the benefit of U.S. provisional patent application Ser. No. 61/080,901, filed Jul. 15, 2008, the content of which is hereby incorporated by reference in its entirety.

BACKGROUND

Field devices are used in industries to control operation of a process such as that of an oil refinery. A field device, such as a process variable transmitter, is typically part of a process communication loop and is located in the field to measure and transmit a process variable such as pressure, flow or temperature, for example, to control room equipment. A field device such as a valve positioner can also be part of the process communication loop and controls position of a valve based upon a control signal received over the process control loop, or generated internally. Other types of controllers control electric motors or solenoids, for example. The control room equipment is also part of the process communication loop such that an operator or computer in the control room is capable of monitoring the process based upon process variables received from transmitters in the field and responsively controlling the process by sending control signals to the appropriate control devices. Portable communicators are often used to configure field devices coupled to the process communication loop. As used herein, the term "process communications loop" is intended to mean any physical connection and media (including a wireless process communication loop) that carries process signals, regardless of whether the connection forms an actual loop. Thus, a process communication loop can be a HART® or FOUNDATION™ Fieldbus segment, even though such a segment is not strictly considered a loop.

With the advent of low-power microprocessors, field devices have undergone significant changes. Currently, many field devices employ digital communication technology as well as more sophisticated control and communication techniques. However, field devices still often employ low-power electronics because in many installations they are required to run on as little as 4 mA. This design requirement prohibits the use of a number of commercially available microprocessor circuits. However, even low-power microprocessors have allowed a vast array of functions for such field devices.

There has been a dramatic increase in the availability of such microprocessor-based field devices. Such field devices are sometimes termed "smart" or "intelligent." There has also been a dramatic increase in the availability of software applications that are used to configure, test, and diagnose these smart field devices. Connection of a general purpose computing device, such as a PC or a portable laptop computer is typically accomplished using a modem communicatively coupled between the computing device and the intelligent field devices. There is a significant array of process communication protocols such as the HART®, FOUNDATION™ Fieldbus, and Profibus protocols that support the various process control tasks. Moreover, it is common to find multiple communication protocols in use in the very same process installation.

SUMMARY

A field device interface module includes a connector, a plurality of terminals, a protocol interface module, a controller and a power supply module. The connector is configured to operably couple to a computer. The terminals are operably coupleable to a field device. The protocol interface module is coupled to the plurality of terminals and configured to generate signals in accordance with a process communication protocol. A power supply module is coupled to the plurality of terminals. The controller is coupled to the protocol interface module and to the power supply module and is configured to measure a voltage across the plurality of terminals and selectively cause the power supply module to provide power to the field device.

DETAILED DESCRIPTION OF ILLUSTRATIVE EMBODIMENTS

Figure 1:
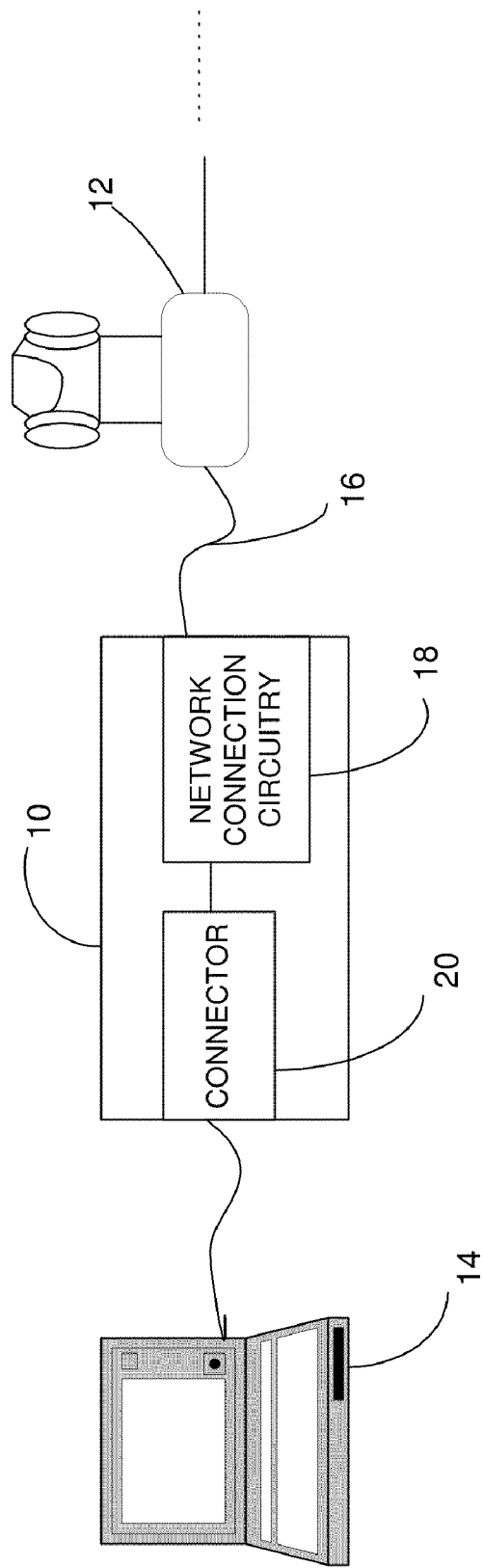
FIG. 1 is a diagrammatic view of a field device interface coupling a field device to a general purpose computing device.

FIG. 1 is a diagrammatic view of field device interface 10 communicatively coupling field device 12 to general purpose computing device 14 (illustrated as a laptop computer). The coupling between interface 10 and field device 12 may be effected via direct connection, such as via wiring terminals within the field device (shown in FIG. 4A), or through process communication loop 16 (shown in FIG. 4B.). Interface 10 includes network connection circuitry 18 that is configured to couple to process communication loop 16 and a connector module 20 that is configured to couple to general purpose computing device 14. Connector module 20 may include any suitable form of connector for connecting to computer 14. Suitable examples include, but are not limited to, universal serial bus (USB) connections, standard serial connections such as those that employ DB9 or DB25 connectors, parallel connections, PCMCIA connections, PCI connections, and firewire connections. In embodiments of the present invention where connector module 20 includes a wired connection to general purpose computing device 14, it is preferred that interface 10 be powered through the wired communication interface. Embodiments of the present invention can also be practiced where the data communication between interface module 10 and general purpose computing device 14 is a wireless connection. Examples of suitable wireless connections include infrared communication, Bluetooth communication, and WIFI communication (such as IEEE 802.11b or IEEE 802.11g). Further, as the art of general purpose computing devices advances, embodiments of the present invention can be practiced using any suitable data communication technique for which the general purpose computer is adapted, whether now known, or later developed.

Figure 2:
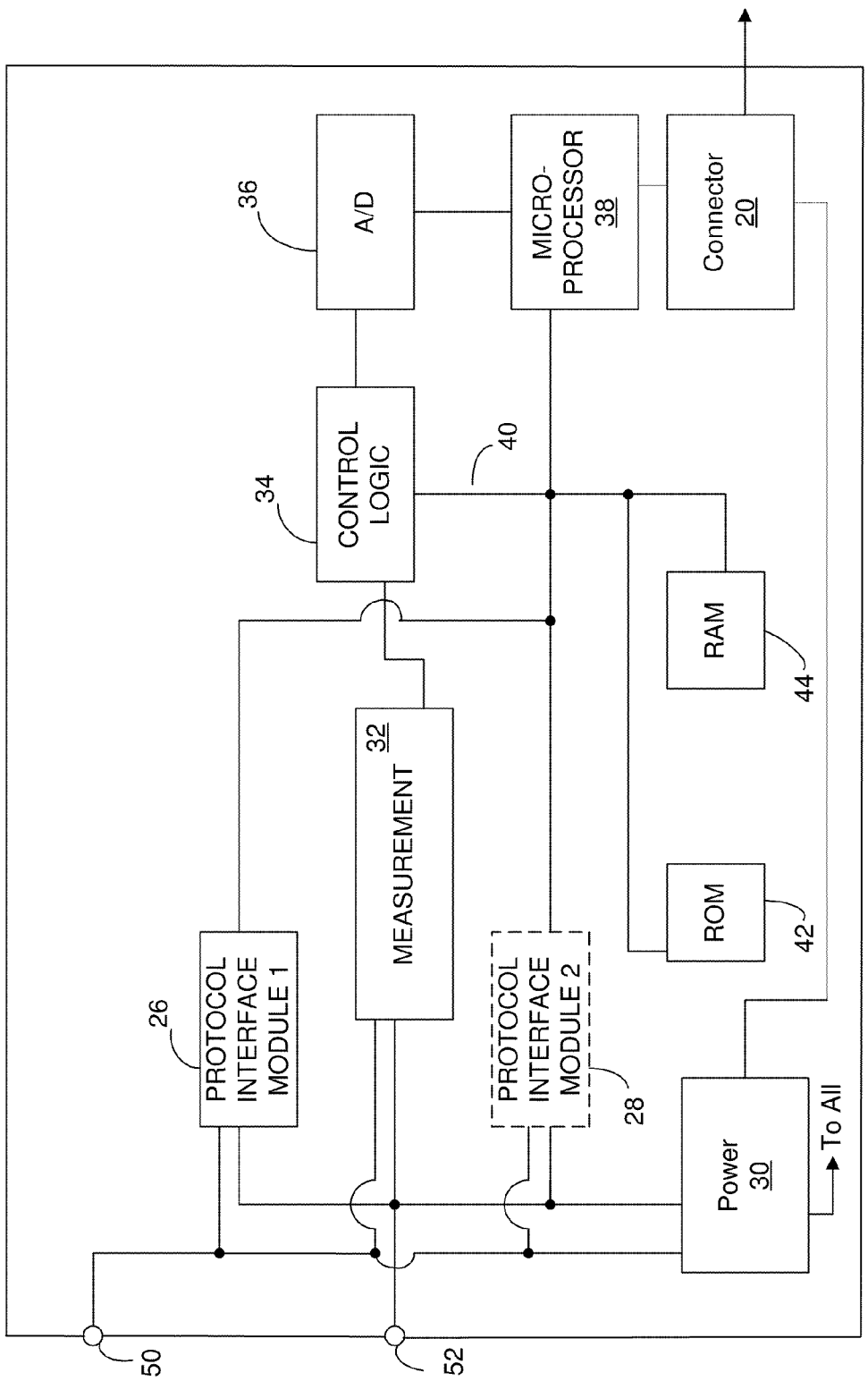
FIG. 2 is a block diagram of a modem in accordance with embodiment of the present invention.

FIG. 2 is a diagrammatic view of field device interface 10 in accordance with an embodiment of the present invention. Field device interface 10 includes microprocessor 38 coupled to connector module 20, which is coupleable to general purpose computer 14 (shown in FIG. 1). Field device interface 10 preferably includes analog-to-digital converter 36 coupled to microprocessor 38. Converter 36 is coupled to measurement circuitry 32 via control logic 34. Microprocessor 38 is also coupled to external data bus 40 through which it interacts with read only memory 42 and random access memory 44. Through data bus 40, microprocessor 38 is also able to interact with protocol interface module 26 and optional second protocol interface module 28 to communicate over respective process communication loops. In embodiments that include a plurality of protocol interface modules, each of the modules is designed to communicate in accordance with a different standard process communication protocol. For example, protocol interface module 26 may be configured to communicate in accordance with the HART® protocol while optional second protocol interface module 28 may be configured to communicate in accordance with the FOUNDATION™ Fieldbus protocol. Additionally, while FIG. 2 illustrates a pair of modules, embodiments of the present invention can be practiced by employing any suitable number of such modules, including one. Additionally, while interface modules 26, 28 are both shown coupled to terminals 50, 52, wireless protocol interface modules need not couple to terminals 50, 52, but couple instead to a suitable antenna.

In accordance with an embodiment of the present invention, microprocessor 38 is configured, through hardware, software, or a combination thereof, to employ measurement circuitry 32 and/or analog-to-digital converter 36 to test voltage across terminals 50, 52 to determine if an attached process communication loop is powered and/or if communication over the loop may be enabled.

Interface module 10 includes power module 30 operably coupled to all components of interface module 10 as illustrated in FIG. 2. In embodiments where interface module 10 is coupled to computer 14 through a wired connection (such as USB connection) power module 30 is configured to condition and/or convert power available from computer 14 to suitable levels for circuitry within interface module 10. Additionally, in embodiments where interface module 10 is not physically wired to computer 14, power module 30 can include a power storage device, such as a battery or supercapacitor, to remain powered without being coupled to a source of power. Additionally, power module 30 is configured to selectively provide power to a process communication loop or field device coupled to terminals 50, 52. Further, power module 30 is also preferably configured to modify impedance to support field device communications. For example, in embodiments that employ HART® communications, power module 30 will preferably include a 250 ohm resistor. However, other networks and process communication protocols may require other circuits.

Many smart instruments (field devices) are two-wire devices where both power for the device is provided and digital communication occurs on the same two wires. These devices are either polarity insensitive, or have reverse polarity protection.

Embodiments of the present invention generally allow technician tasks to be performed on a powered device in the field, or on a technician's bench. Field device interface 10 may simply enable communication (e.g. with a powered device in the field) or may actually power the device and simultaneously enable communications (e.g. during initial setup of the device on the bench). One important consideration in the design of the field device interface is that it be able to enable communication and power field devices, but which still prevent a technician from applying power to an already-powered field device in a plant, and/or automatically determine the field device polarity.

In accordance with an embodiment of the present invention, field device interface 10 includes built in power supply module 30 that allows a technician to power and communicate with a field devices without having to carry and connect a separate power supply. However, applying additional power to a field device that is already powered on an active control loop would disturb the field device signal and information provided to the control system, with potentially serious ramifications. Accordingly, embodiments of the present invention also preferably include methods to safely detect power and/or provide power to a field device. Specifically, embodiments disclosed herein preferably detect power and prevent the power from being enabled if the connected device is already powered. When field device interface is powering a field device and leads are intentionally, or even unintentionally, disconnected from the field device, the power available from field device interface module is turned off. The polarity of the field device can also be determined using measurement circuitry 32 so that the technician does not have to be concerned with the polarity of the connection. As set forth above, the field device interface module can be used to automatically detect power at the field device and potentially provide power to the field device.

In some embodiments, field device interface module 10 is intrinsically-safe. Compliance with intrinsic safety requirements means compliance with an Intrinsic Safety specification such as one or more of the portions of the standard promulgated by Factory Mutual Research in October 1998, entitled APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610.

Figure 3:
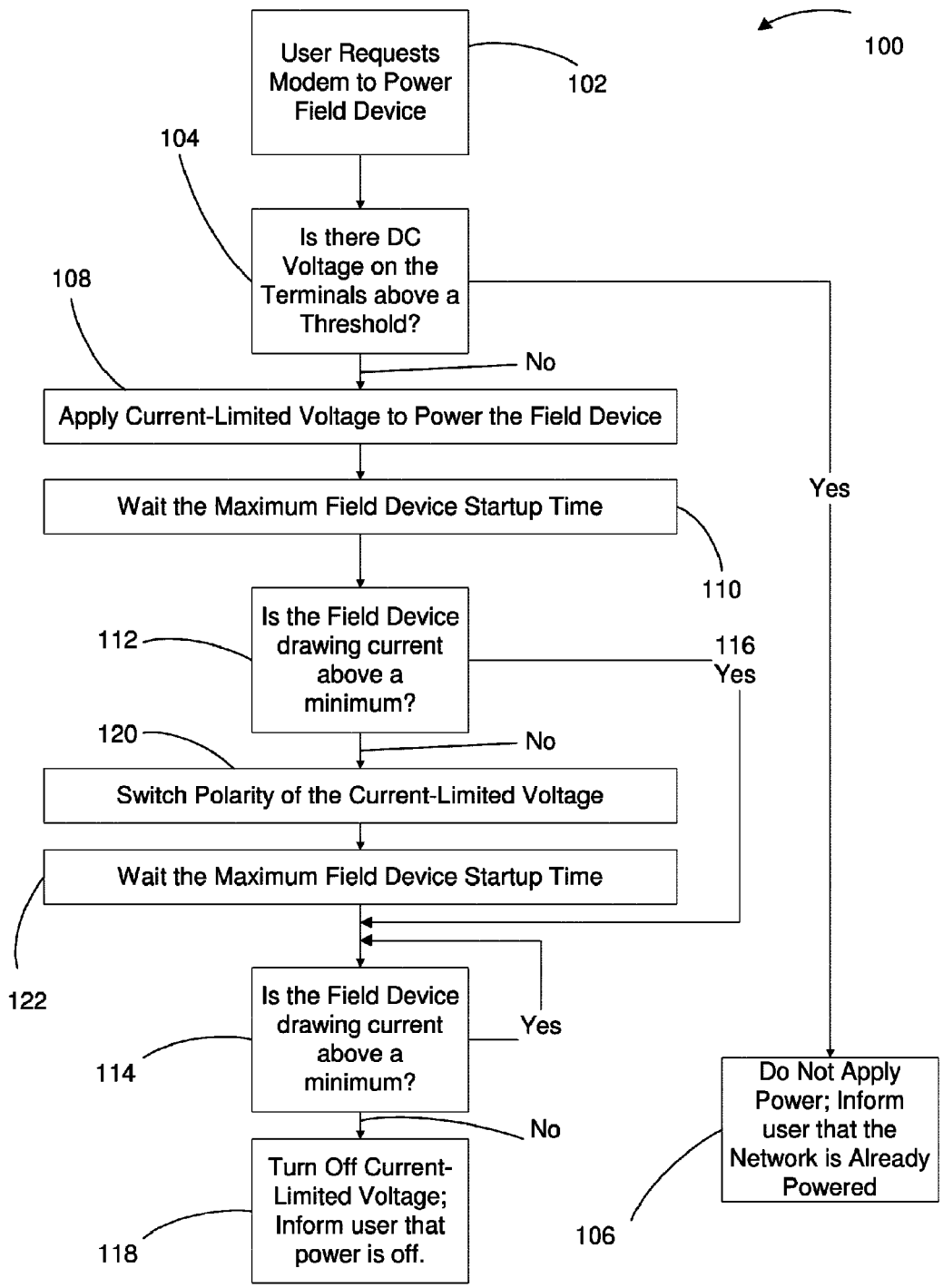
FIG. 3 is a flow diagram of a method of coupling a general purpose computer to a field device using an interface module in accordance with an embodiment of the present invention.

FIG. 3 is a flow diagram of a method of coupling a general purpose computer to a field device using a field device interface module in accordance with an embodiment to the present invention. Method 100 begins at block 102 where the technician requests the field device interface module (modem) to power the attached field device. Upon initial connection of the field device interface module to the field device, the default operation is that no power is provided by the field device interface module to the attached field device. The field device interface module has a method to request activation of built-in power supply 30 for powering the attached field device. This could be a software request or a physical push button or switch, for example. In block 102, the technician has actually requested that power be applied to terminals 50, 52, via software or a physical switch. Control then passes to block 104 where the field device interface module, such as module 10, measures the DC voltage across terminals 50, 52, preferably using measurement circuitry 32. If the measured voltage is above a minimum level for a powered network, then power is not enabled. The field device interface module then provides an indication to the technician that the attached field device is already powered and that no power will be applied, as indicated at block 106. However, if the measured DC voltage is below the minimum level for a powered field device, then control passes to block 108 where a current-limited voltage is applied to terminals 50, 52. The current limit and voltage are set appropriately for the network type. The current flow is constantly monitored, and a field device is expected to draw a minimum amount of current within a defined expected start up time. Accordingly, method 100 waits at block 110, until a maximum field device start up time has elapsed and then passes control to block 112. At block 112, method 100 determines if the attached field device is drawing current above the minimum. If the field device is drawing current level above the minimum, then control passes to block 114 via line 116 where the field device current is continuously monitored to determine if it is above a specified minimum. While the attached field device draws current above the minimum, block 114 essentially loops thereby continuously monitoring field device current draw. When the field device ceases drawing current above the minimum, control passes to block 118 where the current-limited voltage is turned off, and the technician is informed that the power is off.

Returning to block 112, if the device is not drawing current above a minimum, then control passes to block 120 where the polarity of the current-limited voltage is switched. Next, control passes to block 122 where the method waits until the maximum field device start up time has elapsed and then passes control to block 114.

Figure 4A:
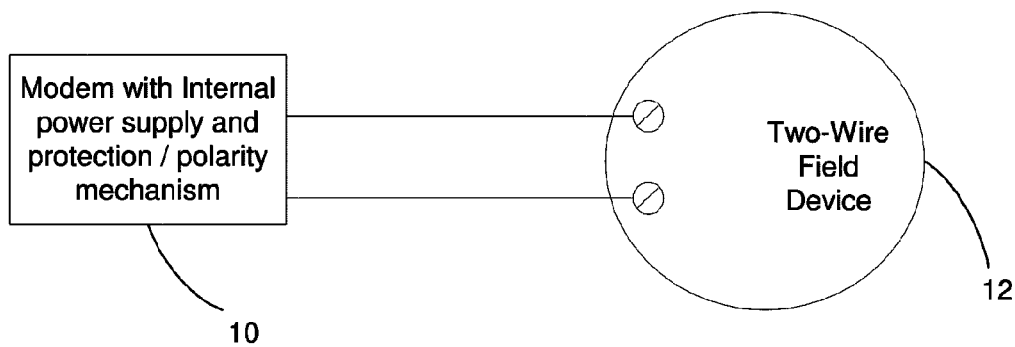
FIGS. 4A and 4B are diagrammatic views of a field device interface operably coupled to a field device in accordance with embodiments of the present invention.

FIG. 4A is a diagrammatic view of a field device interface module with an internal power supply and protection/polarity mechanism coupled to a two-wire field device in accordance with the embodiment of the current invention. Module 10 detects DC voltage, less than a threshold, at the field device terminals, and then powers and enables communication to/from the field device (assuming that the technician has requested power to the field device). This situation typically occurs when the field device is being set up initially or is being worked upon by a technician on a bench-top.

Figure 4B:
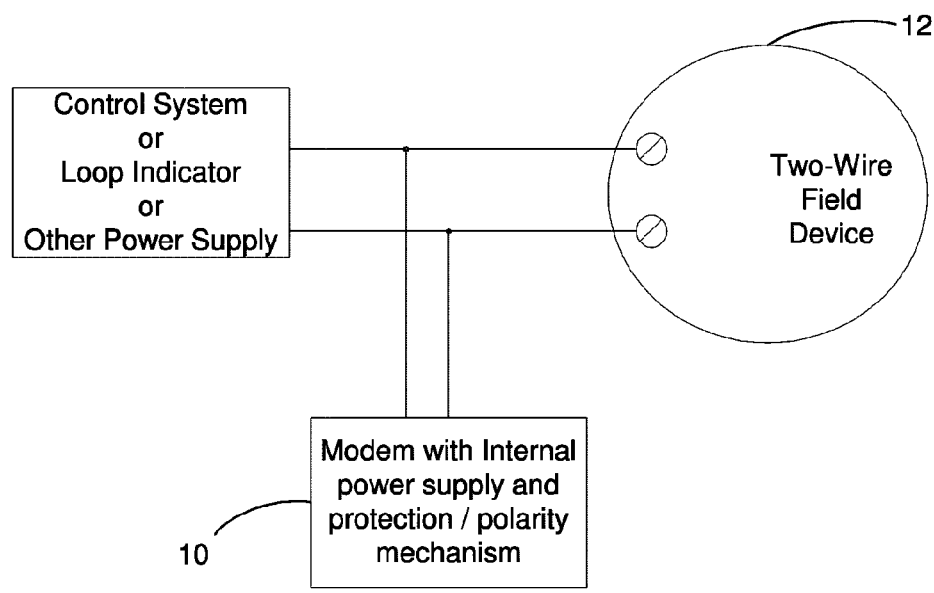

FIG. 4B is a diagrammatic view of a field device interface module with internal power supply and protection/polarity mechanism coupled to a process communication loop disposed between a control system, loop indicator, or other power supply and a two-wire device. As illustrated in FIG. 4B, field device interface module 10 detects DC voltage above a minimum threshold on the process communication loop and only enables communications to/from the device if appropriate. The situation illustrated in FIG. 4B would typically occur when the field device interface module communicates with a field device connected to an operating control system or process indicating system.

Although the present invention has been described with reference to preferred embodiments, workers skilled in the art will recognize that changes may be made in form and detail without departing from the spirit and scope of the invention. For example, while embodiments described herein are provided with respect to a HART® modem, embodiments of the present invention can be practiced with any suitable two-wire industrial protocol where device power and communication occur on the same two wires. Additionally, embodiments of the present invention can be practiced using multiple protocols in a single modem, with or without automatic detection of the communication protocol.

What is claimed is:

1. A field device interface module comprising:
    a connector configured to operably couple to a computer;
    a plurality of terminals operably coupleable to a field device;
    a protocol interface module coupled to the plurality of terminals and configured to generate signals in accordance with a process communication protocol;
    a controller coupled to the protocol interface module;
    a power supply module coupled to the plurality of terminals and coupled to the controller, the power supply module being operably coupled to the connector;
    wherein the controller is configured to measure a voltage across the plurality of terminals and selectively cause the power supply module to provide power to the field device;
    wherein the field device interface module is powered through the connector;
    and wherein the power supply module includes a power storage device.

2. The field device interface module of claim 1, and further comprising measurement circuitry coupled to the plurality of terminals and to the controller, the measurement circuitry being configured to measure voltage across the plurality of terminals and provide an indication thereof to the controller.

3. The field device interface module of claim 1, wherein the power supply module includes a power storage device.

4. The field device interface module of claim 1, wherein the controller is configured to determine if a DC voltage measured across the plurality of terminals exceeds a threshold, and cause the power supply to provide power to the field device if the measured DC voltage is below the threshold.

5. The field device interface module of claim 4, wherein the controller is configured to cause the power supply module to apply a current-limited voltage across the terminals.

6. The field device of claim 5, wherein the controller is further configured to wait until a maximum field device startup time has elapsed and then determine if the field device is drawing current above a minimum current.

7. The field device interface module of claim 6, wherein the controller is further configured to cause the power supply module to reverse polarity of power provided through the terminals if the field device is not drawing current above the minimum current.

8. A method of coupling a field device to a general purpose personal computer, the method comprising:
    receiving a request to power the field device;
    determining if a DC voltage across a pair of terminals operably coupled to the field device is above a threshold;
    applying a current-limited voltage across the terminals if a DC voltage across the pair of terminals is not above the threshold;
    determining if the field device is drawing current above a specified minimum after a maximum field device startup time has elapsed once the current-limited voltage is applied; and
    reversing polarity if the field device does not draw current above the specified minimum.

* * * * *